INVENTORS: W. T. COCHRAN
G. K. HELDER
J. A. MINES

BY R.C. Winter
ATTORNEY

Aug. 4, 1964          W. T. COCHRAN ETAL                3,143,604
                     TRANSMISSION MEASURING SYSTEM
Filed May 29, 1961                                    3 Sheets-Sheet 2

INVENTORS: W. T. COCHRAN
           G. K. HELDER
           J. A. MINES
BY
           R.C. Witter
           ATTORNEY Aug. 4, 1964 W. T. COCHRAN ETAL 3,143,604
TRANSMISSION MEASURING SYSTEM
Filed May 29, 1961 3 Sheets-Sheet 3

INVENTORS: W. T. COCHRAN
G. K. HELDER
J. A. MINES
BY
R.C. Winter
ATTORNEY

United States Patent Office 3,143,604
Patented Aug. 4, 1964

3,143,604
TRANSMISSION MEASURING SYSTEM
William T. Cochran, Chatham, George K. Helder, Plainfield, and James A. Mines, Middlesex, N.J., assignors to Bell Telephone Laboratories, Incorporated, New York, N.Y., a corporation of New York
Filed May 29, 1961, Ser. No. 113,330
15 Claims. (Cl. 179—175.3)

This invention generally relates to transmission measuring systems and particularly relates to a system for ascertaining, by direct measurements, the transmission quality of a communication channel over a range of frequencies.

A communication channel is a path suitable for the transmission of information between two points, and transmission measurements of such channels are customarily required at periodic intervals for the maintenance of communication systems. The measurement is usually a ratio of the signal power at the receiving end of a communication channel to the signal power applied to the transmitting end. It often indicates the gain or loss of the channel in terms of decibels (db). Such routine measurements are generally performed to insure that the channel provides the anticipated loss or gain at prescribed signal frequencies. These measurements are particularly important where abnormal signal attenuation over a channel must be prevented.

Measurements of this type are frequently made by an indirect method in which a plurality of discrete tone signals are successively applied to the sending end of a channel under test, and each of the different signal levels at the receiving end is measured by a db meter. In order for these measurements to be meaningful, the craftsman making the measurements is required to correlate the meter reading with the frequency of the measured signal, and to record each of the different levels read from the meter. The recorded data is then analyzed and evaluated against the channel transmission requirements to determine the quality of the channel.

In many instances, such indirect methods have proven to be unreliable and too complex and expensive. For example, when the sending and receiving ends of a channel under test are separated by a great distance, it is often an extremely difficult task for the craftsman to accurately distinguish each successive tone signal and to correlate it with the corresponding meter reading without utilizing special signal identifying equipment or another craftsman at the sending end to inform him of the transmitted signal frequency. Without the aid of the special equipment or another craftsman, erroneous data is frequently recorded because of the craftsman's inability to correlate the meter readings and the measured signal frequency. Obviously, whenever such erroneous results are caused by a human error, valuable time is wasted, and the communication channel and equipments associated with it are unnecessarily held out-of-productive service. Even when the craftsman obtains the correct data, however, an enormous amount of time is usually consumed in analyzing and evaluating the recorded data to determine the channel quality.

In view of the foregoing, it is desirable to simplify the transmission measuring procedures, to minimize the number of errors made in performing transmission measurements, to reduce the amount of time required to ascertain the quality of a communication channel, and to provide a more economical transmission measuring system than the indirect systems.

Accordingly, a general object of this invention is to simplify the procedures for ascertaining the transmission quality of a communication channel.

A main object is to reduce the time required to ascertain the transmission quality of a communication channel.

A particular object is to provide a more economical and reliable system for measuring the transmission quality of a communication channel, particularly, by eliminating the need for special signal identifying equipment and for a craftsman to inform the person making the measurements of the frequency of the transmitted signal, and, at the same time, minimizing the number of errors that can be made while performing transmission measurements.

Another object is to minimize the time that a communication channel and equipments associated with it are held out-of-productive service due to errors made in performing transmission measurements.

In accordance with this invention, a simple and reliable system is provided for directly measuring the transmission quality of a communication channel over a range of frequencies. Principles of the invention are illustrated herein by way of an exemplary embodiment which directly measures the transmission quality of both loaded and non-loaded telephone lines over a range of frequencies. These lines, as is well-known, are the types most frequently used in telephone systems. A non-loaded line is a two-conductor line which has predetermined transmission losses at predetermined voice frequencies. A loaded line is a two-conductor line which employs series inductance to improve its transmission quality throughout a prescribed voice frequency range. The transmission loss over non-loaded lines is mainly dependent upon both the length of the line and its resistance, while the loss over loaded lines is mainly dependent upon the line resistance and is relatively independent of line length.

The exemplary embodiment includes equipment which is used by a craftsman at a telephone station to make a telephone call over the line to be tested for causing other equipment of this invention, which is located at the telephone central office, to transmit a test signal over the line to the station. This test signal is slowly and continuously varied in frequency within a predetermined voice frequency range and has, at each frequency within the range, an amplitude which is related to the maximum allowed line transmission loss at the corresponding frequency. The reason for weighting or pre-emphasizing the signal amplitude is to allow it to be received at the station under normal conditions at a prescribed amplitude at each of the frequencies within the range.

The equipment used by the craftsman also includes a variable gain transistor amplifier and a meter circuit. This amplifier includes facilities for adjusting the amplifier gain in accordance with the type of line under test. These facilities include apparatus for adjusting the amplifier gain as a function of the line length and apparatus for further adjusting the amplifier gain as a function of the line resistance. A direct reading meter cooperates with the amplifier to translate the received signal amplitudes directly into an indication of the line transmission quality at each of the test frequencies.

A salient advantage of this invention is that it provides for a direct measurement of the quality of a communication channel over a range of frequencies, and thereby eliminates the need for the laborious and time consuming procedures required by the indirect methods of ascertaining the tranmission quality. The present invention, in providing equipment for directly measuring the transmission quality of a communication channel, also eliminates the need for correlating the frequency of the test signals with the meter readings, and thereby minimizes the number of errors that can be made while performing a transmission measurement. Thus, this equipment also minimizes the time that a communication channel and equipment associated with it are held out-of-productive service due to faulty transmission measurements occasioned by human errors.

A feature of our invention is that the transmission quality of a communication channel be ascertained by apparatus applying to one end of the channel a test signal that varies in frequency within a predetermined range and that has an amplitude at each frequency within the range which is related to the maximum prescribed transmission gain characteristic for the channel at the corresponding frequency, and by apparatus for translating the signal amplitudes received at the other end of the channel directly into indications of the channel transmission quality.

A further feature is that the apparatus for applying the test signal to the one end of that channel includes a signal generator for sequentially generating signals of constant amplitude at predetermined frequencies within the desired range and a converter circuit for converting the amplitude of each of the generated signals into an amplitude which is directly related to the maximum allowed transmission loss of the channel at the corresponding frequency.

Another feature is that the apparatus at the other end of the transmission channel directly indicate when the loss between the channel ends is equal to, above, or below the maximum allowed loss at each of the signal frequencies.

Another feature is the provision of such equipment in a telephone system and wherein the equipment includes apparatus for making a telephone call over the channel from the customer station to circuitry in the central office for connecting the hereinbefore mentioned signal generator and converter circuit to the channel.

A still further feature is the inclusion of a transistor amplifier circuit in the apparatus at the receiving end of the transmission channel for amplifying the level of the received test signal, circuitry operatively coupled to the amplifier circuit for rectifying the amplified test signal, and a meter responsive to the rectified signal for directly indicating when the line transmission loss is equal to, greater, or less than the prescribed maximum at each of the test signal frequencies, the meter also manifesting the exact magnitude by which the test signal is greater or less than the prescribed maximum loss at each frequency.

Still another feature is that the magnitude of the line current be determined before the test signals are measured, circuitry being included in the test apparatus of the receiving end of the channel for varying the gain of the amplifier circuit by an amount related to the magnitude of the line current and additional circuitry being included for further varying the gain of the amplifier circuit by an amount related to the length of the line.

The foregoing objects, advantages and features of this invention, as well as others, will be apparent from the subsequent description of the exemplary embodiment thereof shown in the drawing, in which.

Figure 1:
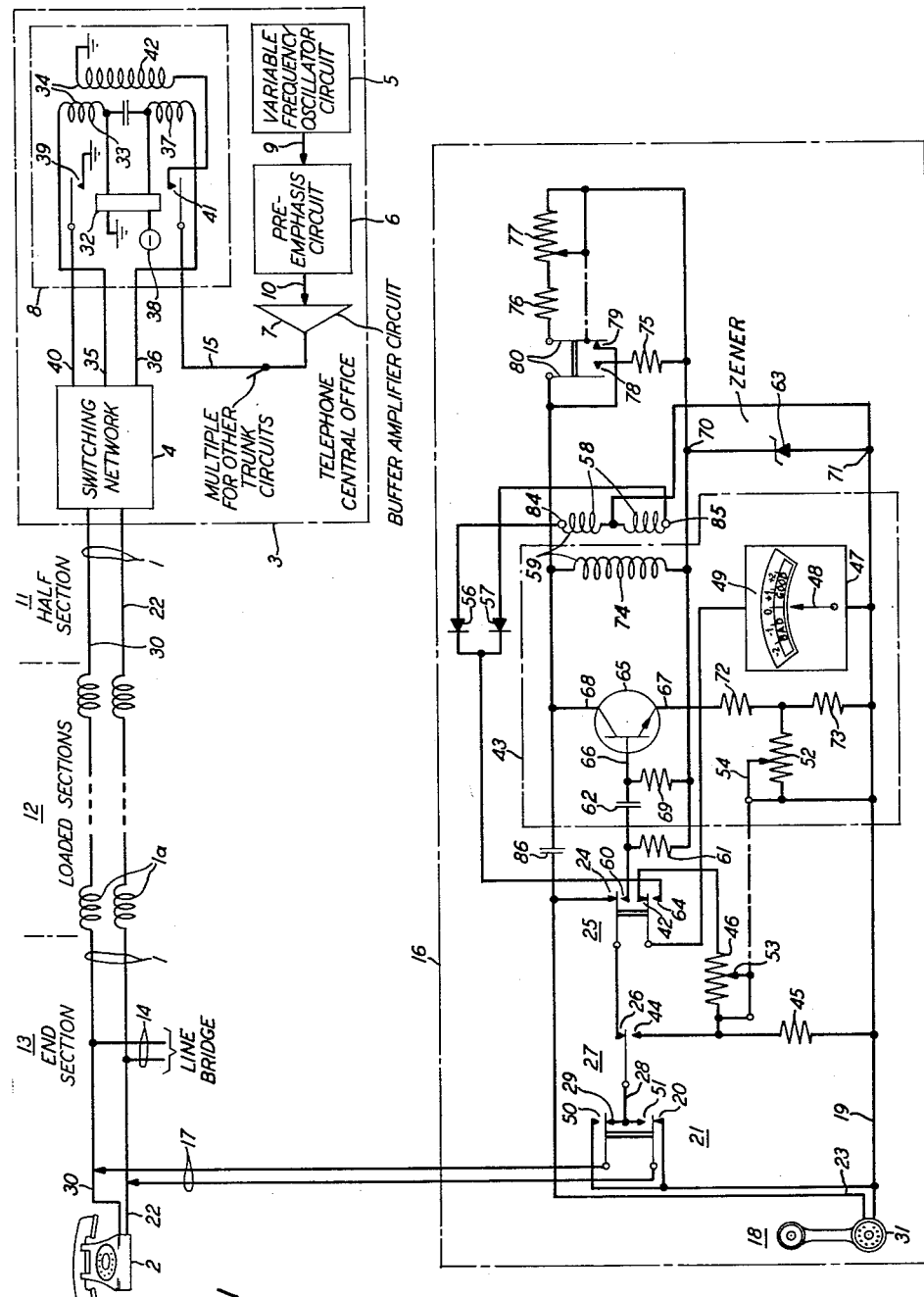
FIG. 1 illustrates, in block and schematic diagrams, a transmission system which comprises a telephone line for serving calls between the telephone central office and a customer station. It also shows the test equipment which is partially located at the central office and partially at the customer station.

A clear and complete understanding of the invention will be obtained by considering the telephone system embodying the invention as represented in the six figures of the drawing. The invention is not, however, to be considered in any way limited in its application to the particular system illustrated in the drawing for it is generally suitable for testing any transmission system.

The interrelation and functions of the equipment used in measuring the quality of signal transmission over the telephone line 1 will now be described with reference to FIG. 1. Shown at the left side of FIG. 1 is a customer station having a conventional telephone set 2 which is connected to the central office 3 over the line 1. The line 1 is a so-called lump-loaded line, that is, one in which the inductance coils 1a, commonly known in the art as loading coils, are serially connected at regular intervals of the line for the purpose of improving its transmission characteristic throughout a prescribed voice frequency range. The inductive reactance of these coils, such as coils 1a, are used to equalize the effects of the capacitive reactance and the conductance of the line conductors which normally tend to attenuate the level of voice signals as a function of their frequency.

Central office 3 includes the usual facilities of a switching network 4, ringing and battery supplies (not shown), etc., for serving telephone calls. These facilities may be similar to those disclosed, for example, in the crossbar telephone system of U.S. Patent 2,585,904 granted to A. J. Busch on February 19, 1952. The line 1 is terminated in the office 3 at the switching network 4, and may be connected through that network, as explained hereinafter, to the test equipment in the office. The latter equipment supplies voice frequency signals which are used for testing the transmission quality through the network 4 and over the line 1 to the customer station. It includes the variable frequency oscillator circuit 5, preemphasis circuit 6, buffer amplifier circuit 7, and trunk circuit 8. These circuits are shown chiefly in block diagram form because each one is well-known in the art. For example, the oscillator circuit 5 may be similar to any of the commercially available mechanically or electrically driven variable audio frequency oscillators.

The primary source of the voice frequency signals used for testing is the oscillator circuit 5. This circuit produces an output signal that is continuously varied in frequency from 1 kilocycle (kc.) through the intermediate frequencies to 3 kc. at a slow rate of speed. A suitable rate for varying the signal frequency between the 1 to 3 kc. limits is once every 10 seconds. The output signal level is constant at all of the frequencies within the defined range.

Figure 2:
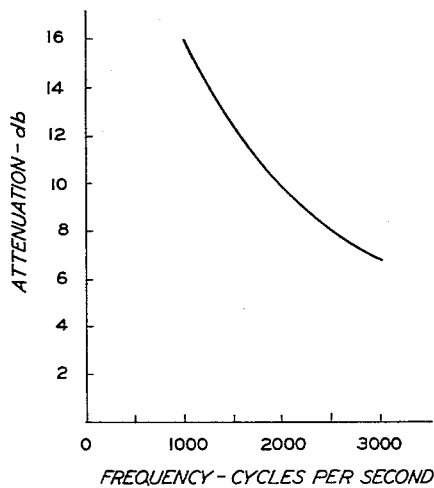
FIG. 2 is a graph illustrating the attenuation-frequency characteristics of the preemphasis circuit shown in FIG. 1.

The signal produced by the oscillator 5 is coupled over conductor 9 to the preemphasis circuit 6 which attenuates its level as a function of its frequency and passes it over conductor 10 to the buffer amplifier 7. Preemphasis circuit 6 is essentially a resistive, inductive and capacitive network. The graph of FIG. 2 shows the amount of attenuation in the circuit 6 at the various signal frequencies between 1 and 3 kc. Preemphasis is used to shape the levels of the signal to be transmitted over the line 1 to magnitudes which are directly related to the maximum transmission loss versus frequency characteristic which a properly designed loaded telephone line is permitted to have at the frequencies from 1 to 3 kc. The overall object of the preemphasis is to permit the test signal at each of the frequencies within the band to be transmitted over a loaded line and to be received at the customer station at approximately the same amplitude.

Before proceeding further with the description of the central office test equipment, it is advisable at this point to explain the manner in which the amount of preemphasis was determined for the loaded lines in accordance with this exemplary embodiment. The preemphasis at the mentioned frequencies was determined by measuring the transmission losses of a number of properly loaded artificial lines. An artificial loaded line is apparatus which simulates a loaded line in its electrical characteristics. The measurements were made by sequentially applying a plurality of discrete tone signals at a fixed db level to a sending end of each of the loaded lines and measuring the db levels of the signals at the receiving end. Each of these lines contained a so-called half section, such as section 11 of line 1; a plurality of loaded sections, such as sections 12 of line 1; a so-called end section, such as section 13 of line 1; and a bridged line on the latter section, such as line 14. The half section was the first 3000 feet of line conductors between the signal source and the first loading coil. Each of the loaded sections was 6000 feet of line conductors between successive loading coils. The end section was the 9000 feet of line conductors between the last loading coil and a conventional telephone set. The bridged line was 6000 feet in length and was connected to the midpoint of the end section. The impedance terminations at the sending and receiving ends of the loaded lines were equal to one another.

Figure 3:
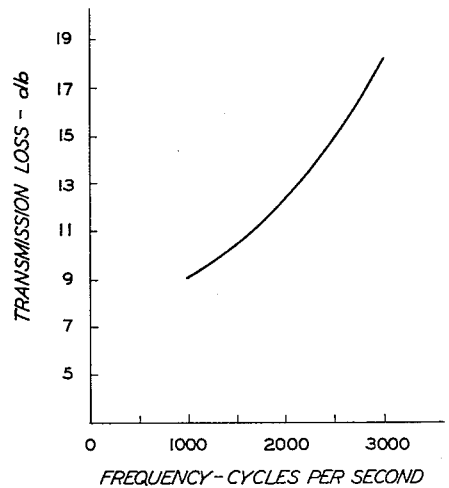
FIG. 3 is a graph illustrating the prescribed maximum transmission loss-frequency characteristics for a group of so-called lump-loaded telephone lines.

FIG. 3 combines in one curve the measured maximum transmission loss versus frequency characteristic of all of the 1400 ohm loaded artificial lines. Since the inductive reactances of the loading coils inserted in series with the line conductors tend to equalize the effects of the capacitive reactance and conductance of the line conductors, the transmission loss versus frequency characteristic is mainly a function of the line resistance. The measurements of loaded lines of different wire gauges, which are frequently used in telephone communication, indicate that the curve depicted in FIG. 3 has approximately the same shape for lines of resistances different from 1400 ohms, and that it would only be displaced upward or downward by approximately .5 db per 100 ohms difference from 1400 ohms. It is noted that the graph of FIG. 3 illustrates the maximum allowed loss for all such lines at any of the frequencies from 1 to 3 kc., and that it is, therefore, unlikely that the loss of any one loaded line will exactly follow this graph.

Returning now to the description of the central office test equipment, the buffer amplifier 7 is a conventional wideband power amplifier with approximately unity gain. The primary purpose of the amplifier 7 is to isolate the preemphasis circuit 6 from the varying load conditions caused by the different impedances of lines, such as line 1, and of trunk circuits, such as circuit 8. The voice frequency signals applied to conductor 10 are passed through amplifier 7 over conductor 15 to the trunk circuits, such as circuit 8. All of the other central office trunk circuits, which are used for testing the transmission quality of telephone lines, are connected in multiple to conductor 15.

Each of the trunk circuits, such as circuit 8, is a switching circuit which is operative, as hereinafter explained, to connect the test signals from conductor 15 through the switching network 4 to a telephone line.

Test equipment 16 of FIG. 1 is used by a craftsman at the customer station for measuring the transmission quality of a channel comprising a trunk circuit, such as trunk circuit 8, over a telephone line, such as line 1, to the customer station. A telephone set 18 is included in the equipment 16 for allowing the craftsman to make a special telephone call over the line under test for causing the central office test equipment to be connected to that line. Equipment 16 also includes a transistor-amplifier meter circuit which is used to determine the transmission quality by measuring the levels of the test signals transmitted thereto from the office test equipment.

Referring to FIG. 1, the manner in which the test equipments are operated to ascertain the transmission quality through the switching network 4 and the telephone line 1 will be described. Although the following description is presented with reference to the loaded line 1, it is noted that the equipment operations are essentially the same when performing measurements over non-loaded lines. The operations which are different are explained at the appropriate sections in the following description. To initiate the test, a craftsman connects the test equipment 16 to the line 1 by means of the connecting conductors 17 at a point nearby the telephone set 2. This point may be, for example, within the customer premises or at a terminal where all of the individual lines from the customer stations are normally joined together in a single cable sheath (not shown) to the central office 3. Junctions of this type are customarily made at a terminal box located on a telephone pole or in the basement of a multi-dwelling building.

At the same time that conductors 17 are connected to the line 1, the telephone set 18 is connected to that line over the paths extending from set 18 through conductor 19, contact 20 of switch 21, and one of the conductors 17 to a conductor of line 1; and from the set 18 through the conductor 23, contact 24 of switch 25, contact 26 of switch 27, conductor 28, contact 29 of switch 21, and the other one of the conductors 17 to the other conductor of line 1. As a result, a direct current (D.C.) circuit (which is not completely shown in the drawing) is closed over line 1 in the usual manner to send a service request signal to the central office 3.

As is fully described in the previously identified Busch patent, the request for service is served by the conventional central office equipment (not shown), and it then returns dial tone over the line 1 to the set 18. Thereafter, the craftsman operates the dial mechanism 31 of set 18, which opens and closes the D.C. circuit, to send coded signals over line 1. The receipt of these coded signals at the office 3 causes connections to be established from the line 1 through the switching network 4 to a special idle trunk circuit, such as circuit 8. After these connections are established, a D.C. circuit is completed for operating the relay 32 in the trunk circuit 8. This operating circuit extends from ground potential in the circuit 8 through the upper winding of relay 32, winding 33 of transformer 34, conductor 35, apparatus (not shown) of network 4, a conductor 30 of line 1, one of the conductors 17, contact 29 of switch 21, contact 26 of switch 27, contact 24 of switch 25, conductor 23, set 18, conductor 19, contact 20 of switch 21, a conductor 17, the other conductor 22 of line 1, apparatus (not shown) of network 4, conductor 36, winding 37 of transformer 34, and the lower winding of relay 32 to the negative potential 38. The D.C. current which flows in this circuit operates relay 32.

Upon operating, relay 32 closes its contact 39 to connect a supervisory ground signal to conductor 40 to indicate that the circuit is busy, and to maintain operated for the duration of the test the apparatus (not shown) in the switching network 4 which is associated with circuit 8 and line 1. The manner in which this signal may be effective to control that apparatus is disclosed in FIG. 217 of the aforementioned Busch patent and described in column 125 of its specification.

When relay 32 operates, it also closes its contact 41 to connect the voice frequency signals from conductor 15 to the winding 42 of transformer 34. These signals are then coupled from the winding 42 to windings 33 and 37 of the transformer 34 and over the previously described path including line 1 to the telephone set 18.

After these signals are received at the telephone set 18, the craftsman operates the switch 27 preparatory to adjusting the gain of the transistor amplifier circuit 43. The gain is adjustable because the transmission loss over different lines will vary dependent upon whether the line under test is loaded or non-loaded and its electrical properties. For tests involving loaded lines, the gain of the amplifier 43 is adjusted as a function of the D.C. current flowing in the operate circuit of relay 32.

The magnitude of this current is dependent upon the negative voltage 38, the resistances of the windings of relay 32, the line resistance and the resistance of the line termination in the equipment 16. This current varies under direct control of the resistance of the line under test since the voltage 38 and the other resistances in the circuit are relatively fixed. Hence, the gain of the amplifier 43 is made to depend mainly upon the resistance of the line under test. The line resistance includes the resistance of its conductors, their insulation resistance, and the resistance of the loading coils. The reason for adjusting the gain of amplifier 43 in this manner is that the transmission loss over a properly loaded line is mainly determined by the line resistance since the maximum allowed loss characteristic of such a line varies from the characteristic of FIG. 3 by approximately .5 db per 100 ohms line resistance difference from the 1400 ohm loaded line. In tests involving non-loaded lines, however, the transmission loss over the line is mainly dependent upon the capacitance of the line conductors as well as the line resistance since loading coils are not included for equalization purposes. This capacitance is mainly dependent upon the length of the line conductors. Therefore, as is hereinafter described, when the test is made over a non-loaded line, the gain of circuit 43 is adjusted as a function of both the line length and the D.C. current flowing in the operate circuit of relay 32, which, as mentioned previously, is mainly dependent upon the line resistance.

Upon the operation of switch 27, its contact 26 is opened to disconnect the set 18 from the line 1, and its contact 44 is closed to connect resistor 45 into the operate circuit of relay 32 in place of the set 18 for holding the relay 32 operated. Meter 47, contact 42 of switch 25 and potentoimeter 46 are connected in parallel with the resistor 45 for measuring the D.C. current which is flowing in line 1. The magnitude of this current is determined by the total resistance of the present operating circuit for relay 32 and by the fixed potential 38 supplied in the trunk circuit 8. The current which flows through the meter 47 causes the indicator 48 of that meter to be deflected to various areas of its scale 49. While viewing the scale 49 and indicator 48 of the meter 47, the craftsman proceeds to adjust the knob 55 of FIG. 6. If the indicator 48 is forcefully deflected, or pegged, to the left of the area marked BAD on the scale 49, while adjusting knob 55, it indicates that the current applied to the meter is flowing in the wrong direction and that each of the conductors 17 has been connected to the wrong conductors of the line 1. Upon viewing such a condition, the craftsman operates the reversing switch 21 to open its contacts 20 and 29, and to close its contacts 50 and 51 for reversing the connections between the conductors 17 and the conductors 19 and 28, and thereby causing the current flow through the meter 47 to be in the proper direction. An advantage in using such a reversing switch is that the craftsman is not required to release the central office equipment while reversing the conductors 17. In the subsequent description, it is assumed that the switch 21 is not operated and that the current flowing through meter 47 is in the proper direction.

Figure 6:
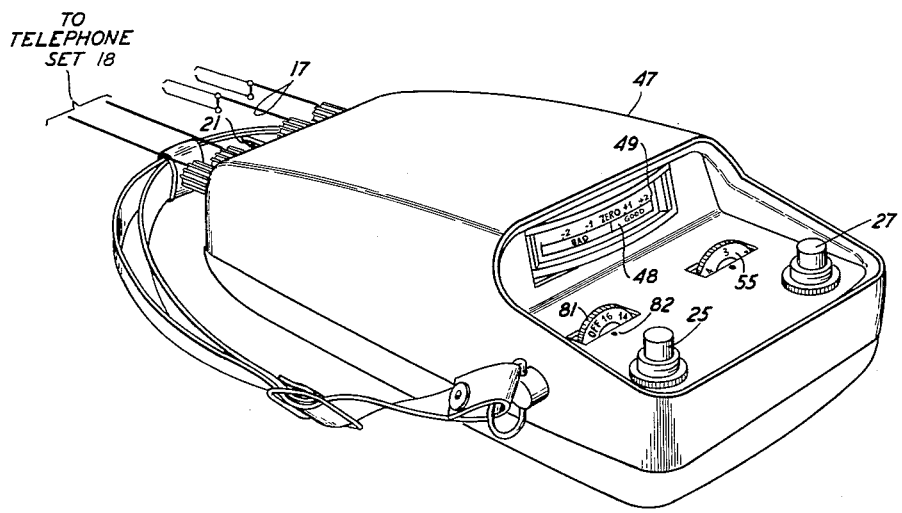
FIG. 6 is a perspective illustration of the measurement equipment which houses all of the circuitry and apparatus used by a craftsman at the customer location.

While viewing the scale 49 and indicator 48 of the meter 47, the craftsman then proceeds to rotate the knob 55 of FIG. 6 for adjusting the resistance of potentiometer 46 until the indicator 48 rests at the zero point on scale 49. The potentiometers 46 and 52 are gang controlled, that is, their resistances are adjusted by means of a single shaft (not shown) which motivates their respective arms 53 and 54. This shaft is operatively connected to the knob 55. Thus, at the same time that the resistance of potentiometer 46 is being adjusted to "zero" the meter 47, the resistance of potentiometer 52 in the emitter circuit of the transistor 65 is varied to set the gain of that amplifier to the value required for the test. The actual gain of the amplifier 43 for various tests is discussed further in subsequent paragraphs.

When the indicator 48 has been moved to the zero point on the scale 49, the craftsman deactivates the switch 27 and thereby recloses its contact 26 to reconnect the telephone set 18 into the operate circuit for relay 32 for holding it operated. The deactivation of the switch 27 also reopens its contact 44 for disconnecting the resistor 45, potentiometer 46 and meter 47 from the operate circuit for relay 32.

The craftsman then proceeds to operate the switch 25 for effecting a measurement of the transmission quality. The operation of switch 25 opens its contact 24 to again disconnect the telephone set 18 from the operate circuit for relay 32, and also closes its contact 60 to connect the resistor 61 and zener diode 63 into that operate circuit in place of set 18 for holding the relay 32 operated.

When the contact 60 is initially closed, a reverse bias voltage for the diode 63 is applied over the operate circuit for relay 32 to breakdown that diode and, thereafter, to cause it to operate in its zener region. The path for applying this voltage extends from the negative voltage 38 in the trunk circuit 8 through the lower winding of relay 32, winding 37, conductor 36, apparatus (not shown) in the network 4, conductor 22 of line 1, a conductor 17, contact 20, conductor 19, diode 63, resistor 61, contacts 60, 26 and 29, a conductor 17, conductor 30 of line 1, apparatus (not shown) in the network 4, conductor 35, winding 33, and the upper winding of relay 32 to ground.

The D.C. current which flows in this circuit is sufficient to hold relay 32 operated, and to develop a voltage across the diode 63 which is required for the operation of the amplifier 43. An advantage of using this zener diode circuit for developing the operating voltage is that a battery is not required and, consequently, the operating cost of the test equipment is inexpensive and its necessary size is reduced.

Upon the operation of switch 25, its contact 64 is also closed to connect the meter 47 into the rectifier circuit comprising the diodes 56 and 57 and winding 58.

Before proceeding further with the description of the transmission quality measurement, it is advisable at this point to explain the characteristics of the amplifier circuit 43. This amplifier employs the npn transistor 65 which has a base 66, emitter 67 and collector 68 electrodes arranged in a common emitter configuration. The base electrode 66 is connected to the RC coupling network comprising resistor 69 and capacitor 62. This network is designed to substantially block signals at frequencies below 1000 cycles from being applied to the base electrode 66. Fixed bias for the emitter-to-base junction of the transistor 65 is obtained from the positive voltage at the reference point 70 of the diode 63 which is applied to the base electrode 66 through resistor 69, and from the negative voltage (negative with respect to point 70) at refernece point 71 which is applied to the emitter electrode 67 through the resistors 72 and 73 and the potentiometer 52. Thus, the emitter-to-base junction of transistor 65 is normally forward biased.

Collector electrode 68 of transistor 65 is connected to the positive voltage at point 70 through the winding 74 of the transformer 59 and a resistive shunt which is connected in parallel with winding 74. The shunt comprises the resistors 75 and the contact 78 of the ON-OFF switch 80 for measurements involving loaded lines, and, for measurements involving non-loaded lines, the resistor 76, potentiometer 77, and the contact 79 of the ON-OFF switch 80. The operation of the contacts 78 and 79 and the resistance of potentiometer 77 are controlled by a common shaft mechanism (not shown). The knob 81, shown in FIG. 6, is affixed to this shaft, and a marked scale is located about the periphery of that knob as shown in FIG. 6. This scale is marked to indicate the off position of the switch 80 and the various lengths of non-loaded telephone lines that are frequently tested.

Prior to conducting the transmission test over a loaded line, the craftsman adjusts the knob 81 so that the area marked OFF on its scale is set to the index 82 on the meter housing. When this adjustment is made, the contact 78 is closed to connect the resistor 75 in parallel with the winding 74 for determining the magnitude of the amplified test signal current flow through that winding during testing. At the same time, contact 79 of switch 80 is opened to disconnect the resistor 76 and potentiometer 77 from across the winding 74. On the other hand, before performing a transmission measurement over a non-loaded line, the craftsman adjusts the knob 81 so that the marked position on its scale corresponding to the length of the line under test is set to the index 82. When this adjustment is made, the switch 80 is actuated to close its contact 79 to connect the resistor 76 and the resistance of potentiometer 77 in parallel with the winding 74 for determining the magnitude of the amplified test signal current flow through that winding during a measurement, and hence the magnitude of that signal which is coupled to the winding 58 of transformer 59 to operate the meter 47. The actuation of switch 80 also opens its contact 78 for disconnecting resistor 75 from across the winding 74.

The emitter-to-base junction of transistor 65 is forward biased to set the operating region of the amplifier circuit. The path of the bias current is mainly from the negative voltage at point 71 through the parallel resistance combination of resistor 73 and potentiometer 52, resistor 72, the emitter-to-base resistance of transistor 65, and resistor 69 to the positive voltage at the point 70. The magnitude of this current is controlled by resistance of potentiometer 52. This potentiometer resistance, as mentioned previously, was adjusted by the craftsman at the same time that the meter 47 was zeroed. The D.C. collector current flowing as a result of regular transistor action passes through the winding 74 and the resistance connected in parallel with that winding to the positive potential at point 70. The magnitude of this parallel resistance, as previously explained, is dependent upon the type of line under test.

The fixed gain of the amplifier 43 for tests involving loaded lines is approximately 6.3 db at the frequencies from 1 to 3 kc. This gain is fixed with the maximum resistance of potentiometer 52 in the emitter circuit of transistor 65 and the resistor 75 in parallel with the winding 74. In tests involving a loaded line, the gain is increased from 6.3 db to a value greater by approximately .5 db for every 100 ohms of line resistance. For example, if the line resistance is 1400 ohms, the gain is increased to approximately 13.3 db. Thus, when the amplifier gain is 13.3 db and the level of the input test signal to the amplifier is −15.5 db, which is the minimum allowed for a measurement involving a 1400 ohm loaded line, the meter indicator 48 will be deflected to the zero mark on the scale 49. This gain is necessitated by the meter sensitivity which, for purposes of this embodiment, may be 100 microamperes for full scale deflection.

Returning now to the previous description, the manner in which the transmission quality is measured will be explained. Upon the operation of switch 25, the A.C. test signal transmitted from the central office test equipment is coupled from the line 1 over a conductor 17 through the contact 29 of switch 21, contact 26 of switch 27, contact 60 of switch 25, and the capacitor 62 to the base electrode 66 of transistor 65. These signals are amplified in the transistor 65, and the resultant amplified A.C. collector current flowing through the winding 74 causes signal voltages to be developed across the winding 58. The magnitude of each of the voltages developed across winding 58 at each of the signal frequencies from 1 to 3 kc. is proportional to the transmission loss versus frequency characteristic of the line 1 and the gain of amplifier 43. The signal voltages developed across winding 58 are converted into a unidirectional current flow by the full wave rectifier circuit comprising the center-tapped winding 58 of transformer 59, diodes 56 and 57, contact 64 of switch 25, and the meter 47. When the potential at the terminal 84 of winding 58 is positive with respect to terminal 85 of that winding as the result of the induced A.C. voltage, the diode 57 is reversed biased and current flows from terminal 84 through diode 56, contact 64, and the meter 47 to the center tap of winding 58. When the potentials across winding 58 are reversed by the other half cycles of the induced A.C. signal, diode 56 is reversed biased and current flows from terminal 85 through diode 57, contact 64, and the meter 47 to the center tap of winding 58. It is noted that this current always flows in the same direction through meter 47. As a result of this current, the indicator 48 is deflected into either the good or bad area of the scale 49.

When the meter 47 reads zero, it means that the transmission loss introduced by the line 1 is the maximum allowed value for such a line. A reading in the area marked GOOD on the scale 49 indicates that the loss is less than or below the maximum value. Similarly, a reading in the BAD area on the scale 49 indicates that the loss over line 1 is greater than or above the prescribed maximum value.

Thus, the task of the craftsman is measuring the quality of transmission from the trunk circuit 8 over line 1 to the test equipment 16 is greatly simplified using equipments of this invention; particularly, because it is only necessary for him to read the GOOD or BAD quality on the meter 47 instead of a plurality of discrete db level or comparative logarithmic units for the various test frequencies. In addition to providing the GOOD or BAD quality indication, however, scale 49 may also include discrete db markings as are shown in FIGS. 1 and 6 to allow the craftsman to ascertain, if desired, the particular db value by which a test signal frequency is above or below the maximum allowed transmission loss. For example, a reading of +1 db from the scale 49 indicates that the transmission loss introduced by the line 1 is 1 db less than the maximum allowed value.

If the line 1 is properly loaded, that is, each of the required loading coils is inserted in series with its conductors 22 and 30 at the prescribed intervals, the magnitude of the rectified currents, which flow through the meter 47 as the frequency of the received test signal is slowly varied from 1 to 3 kc., will be sufficient to cause the indicator 48 to be deflected into the area marked GOOD on the scale 49. Indicator 48 will fluctuate in this area because the levels of the received test signal will vary slightly at each of the frequencies from 1 to 3 kc. The signal levels vary through the frequency band because the transmission loss versus frequency characteristic of the loaded line 1 is not exactly proportional to the pre-emphasized levels of the signal applied to the line 1 at the central office. It may be recalled from the previous discussion that the amount of pre-emphasis was empirically determined from transmission measurements of a plurality of properly loaded artificial lines and that the transmission loss versus frequency of a loaded telephone line will not be exactly proportional to the transmitted signal levels.

On the other hand, if the line 1 is not properly loaded, the level of the received test signal may fail to be within the prescribed minimum at all of the frequencies from 1 to 3 kc. As a result of receiving a test signal below the prescribed minimum, the rectified current which then flows through the meter 47 will cause its indicator 48 to be deflected into the area marked BAD on the scale 49 at the frequency where the received test signal level is below the prescribed minimum. Since the frequency of this signal is slowly varied, the indicator 48 will fluctuate between the GOOD and BAD areas of the scale 49 as the levels of the signal at the various frequencies change above and below the prescribed minimum. Improper loading of the line 1 may be the result of, for example, the deletion or addition of a loading coil, the placement of a coil at the wrong section of the line, or the use of the wrong type of loading coil.

The transmission quality over the loaded line 1 may also be impaired by an auxiliary line, such as the line 14, which may be bridged thereto for providing the conventional party line telephone service. Such a line bridge can reduce the transmission quality when it is excessively long, or loaded, or improperly placed. The results of testing the transmission quality over the line 1 with the bridged line 14 are substantially the same as previously described with respect to line 1. That is, if the line 1 is properly loaded and the line 14 is not excessively long, or loaded or improperly placed, the reading obtained from the meter 47 will indicate that the transmission quality is good. However, if both lines 1 and 14 are improperly loaded, or either one is improperly loaded, or if line 14 is excessively long, the reading from meter 47 will indicate that the level of the received test signal at a certain frequency is below the prescribed minimum.

The test equipments of this invention can also be used to measure the quality of the test signal transmission over non-loaded telephone lines in essentially the same manner as for measurements involving loaded lines. A non-loaded line is one in which no loading coils are inserted between the customer telephone set and the switching network 4. As was previously explained, the transmission loss versus frequency characteristic for such a line is determined mainly as a function of the line resistance and the line capacitance as fixed by its length. To simplify the understanding of the manner in which the equipments are operated to measure the transmission quality over a non-loaded line, it is assumed that the line 1 of FIG. 1 is a non-loaded, 26 gauge line, 6 kilofeet in length. The nominal resistance of this line is approximately 500 ohms. It is to be understood that the assumption is made only for the purpose of illustrating features of this invention and it is not to be considered in any way as limiting the application of this equipment for it can be utilized in the same manner as now to be described for measuring the transmission quality over all types of non-loaded lines.

In performing the quality measurement of the non-loaded line 1, the craftsman operates the equipment 16, in a similar manner as previously explained with respect to the loaded line, to cause the test signal at the pre-emphasized levels to be applied in the central office 3 to the non-loaded line 1. The craftsman then proceeds to measure the D.C. line current, as hereinbefore described, in order to adjust the gain of the amplifier circuit 43 to the value required for the particular line under test. For tests involving non-loaded lines, the fixed minimum gain is approximately 5.3 db. This gain is fixed with the maximum resistance of the potentiometer 52 in the emitter circuit of the transistor 65, and the minimum resistance of the potentiometer 77 and the resistor 76 in parallel with the winding 74. The gain is adjusted from this value, as hereinbefore explained, as a function of the length and resistance of the line under test. Prior to performing the quality measurement of the non-loaded line 1, the amplifier gain is initially increased from 5.3 db to a value greater by approximately .5 db for every two kilofeet of the line under test. This gain is further increased approximately .5 db for every 100 ohms of the line resistance, as hereinbefore described, during the measurement of the D.C. line current.

When a quality measurement is made of a non-loaded line of a certain resistance, the gain of the amplifier 43 is usually greater than it is when a measurement is made of a loaded line of the same resistance. The gain is greater by approximately .5 db for every 2 kilofeet beyond the first 4 kilofeet of the non-loaded line. This additional gain is provided, as explained hereinbefore, by the special adjustment of the length control potentiometer 77. For example, when a measurement is to be made of the 6 kilofeet, 500 ohm, non-loaded line 1, the potentiometer 77 is adjusted prior to performing the measurement to increase the gain of the amplifier 43 from 5.3 to 6.8 db. Thereafter, when the D.C. line current is measured, as previously explained, the gain is further increased from 6.8 to 9.3 db. In contrast, when a quality measurement is made of a 500 ohm loaded line, the amplifier gain is 8.8 db.

Figure 4:
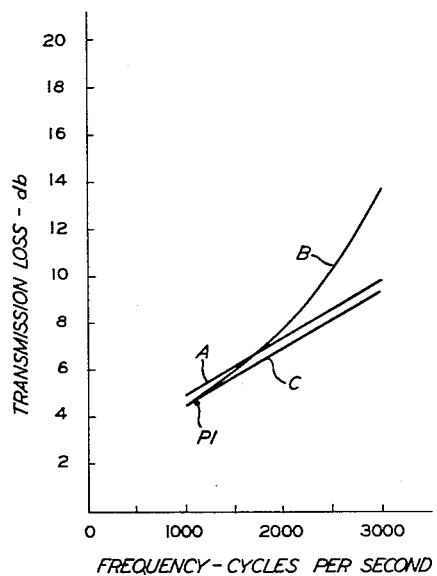
FIGS. 4 and 5 are graphs illustrating the prescribed maximum transmission loss-frequency characteristics of so-called non-loaded telephone lines.

Before proceeding further with the description of measuring the quality of the non-loaded line 1, it is advisable to first mention the maximum transmission loss versus frequency characteristics which are prescribed for this non-loaded line 1 and for 500 ohm loaded lines. Referring to FIG. 4, the prescribed characteristic for the non-loaded line 1 is shown by the curve A. The maximum allowed loss versus frequency characteristic for 500 ohm loaded lines is also shown in FIG. 4 by the curve B. Each of these curves was empirically determined in essentially the same manner as hereinbefore described with respect to loaded lines. It is noted that the losses depicted in FIG. 4 are measured maximum values for a plurality of lines and that it is unlikely that the loss characteristic of any individual line will be exactly equal to the prescribed maximum value at each of the test frequencies.

The transmission quality of a non-loaded line is measured by the equipment of this invention at one main frequency in the band between 1 and 3 kc. Quality is accurately measured in this way because the loss of such lines is relatively fixed by their uniform resistive, capacitive and inductive properties per unit length. In accordance with this invention, the frequency at which the quality is mainly measured is different for lines of different wire gauges and lengths.

The frequency at which the quality of a non-loaded line is mainly measured can be readily determined with the aid of a graph having curves representing the maximum allowed loss versus frequency characteristics for that non-loaded line and for a loaded line having the same resistance as the non-loaded line, and with the aid of the value of the prescribed difference in the gain of the amplifier 43 when it is used for performing a quality measurement of these two specified lines. For example, the frequency at which the quality of the non-loaded line 1 is mainly measured can be determined with the aid of the curves A and B in the graph of FIG. 4, and with the aid of the aforementioned .5 db difference in the gain of the amplifier 43 when it is used for performing a quality measurement of the non-loaded line 1 and a loaded line having the same 500 ohms of resistance. This determination is facilitated by then reducing the maximum allowed loss by .5 db at each of the test frequencies to form the curve C as depicted in FIG. 4. Referring to FIG. 4, it is noted that the curve C is tangent to the associated curve B at the point P1 which corresponds to 1.1 kc. It is at this frequency that the quality of the non-loaded line 1 is mainly measured.

Figure 5:
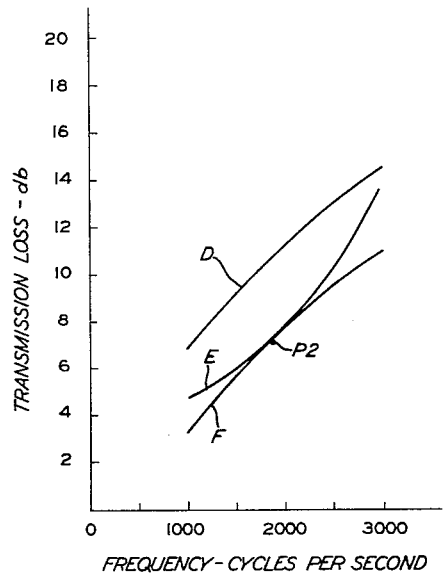

The different individual frequencies at which the quality of other non-loaded lines is mainly measured can be determined in essentially the same manner as described for the non-loaded line 1. To cite another example, the main test frequency for a 500 ohm, 18 kilofeet, non-loaded line can be determined with the aid of the loss curves D and E of FIG. 5 which represent, respectively, the maximum allowed loss versus frequency characteristics for the defined non-loaded line and for a 500 ohm loaded line; and with the aid of the prescribed 3.5 db difference in the gain of the amplifier 43 when it is used for performing a quality measurement of these two types of lines. The maximum allowed loss is then reduced by 3.5 db at each of the test frequencies to form the curve F of FIG. 5. The curves E and F are tangent at the point P2 which corresponds to 1.85 kc., the main test frequency for the defined non-loaded line.

Returning to the previous description, an explanation is presented of the measurement of the transmission quality of the non-loaded line 1. When the pre-emphasized test signal coupled from the non-loaded line 1 is amplified by the amplifier 43 during the quality measurement and is applied to the rectifier circuit comprising the meter 47 and diodes 56 and 57, the unidirectional current produced at the main test frequency will cause the meter indicator 48 to be deflected to the GOOD-BAD boundary on the scale 49 if the maximum allowed loss is encountered over the line at that frequency. The unidirectional currents produced at all of the other test frequencies should be correspondingly greater if the loss of the line at the main test frequency is equal to or not greater than the maximum allowed value and, as a result, these currents will cause the indicator 48 to be deflected into the GOOD area of the scale 49 as the test signal frequency is slowly varied about the tangent frequency.

The transmission quality of the non-loaded line 1 can be impaired by a non-loaded line, such as line 14, being bridged thereto. Such a line bridge may be provided for the purpose of providing party line service or simply for building flexibility into the line circuit design. If such a bridged line is excessively long, it will increase the loss beyond the maximum allowed loss at the main test frequency. Consequently, the resultant current which flows through the meter 47 will cause the indicator 48 to be deflected to the BAD area on the scale 49.

If a loaded line is bridged to the non-loaded line 1, such as for providing party line service, the loss over line 1 may be increased beyond the maximum at one or more of the test frequencies and consequently will cause a BAD reading to be obtained from the meter 47 during the measurement.

During the time that the craftsman is reading the transmission quality from the meter 47, he can also monitor the amplified levels of the test signal by means of the telephone set 18. This signal is transmitted to the set 18 over the circuit extending from collector electrode 68 of transistor 65 through capacitor 86, conductor 23, set 18, conductor 19, the parallel resistance combination of potentiometer 52 and resistor 73, resistor 72, and the emitter-to-collector resistance of transistor 65. This facility permits the craftsman to check that the test signal is actually being received during the qualtity measurement and that the amplifier 43 is operative. Consequently, the possibility of obtaining erroneous data because of an absent test signal or an inoperative amplifier is reduced.

At the same time that the craftsman is monitoring the amplified test signal by means of the telephone set 18, he may also ascertain whether noise or cross-talk signals exist on the line under test. This permits the craftsman to better evaluate the contribution of such unwarranted signals to the quality measurement obtained using the test signal.

After the transmission quality has been ascertained, the craftsman deactivates the switch 25 and thereby disconnects the amplifier 43 from the line 1 and reconnects thereto the telephone set 18. Upon the deactivation of switch 25, the apparatus of the test equipment 16 is returned to the condition as shown in FIG. 1. The craftsman may then proceed to disconnect the conductors 17 from the line 1 to effect the release of the central office circuits. When these conductors are disconnected, the operate circuit for the relay 32 in the circuit 8 is opened and the relay is released. As a result, relay 32 opens its contact 41 for disconnecting the amplifier 7 from the winding 42 of transformer 34, and also opens its contact 39 for removing the ground potential from the conductor 40 to thereby cause the apparatus (not shown) in the switching network 4 to release. Regular telephone service may then be rendered over the line 1.

While the equipments of this invention have been described with reference to a particular embodiment in a telephone system, it is to be understood that such an embodiment is intended only to be illustrative of the principles of the invention and the numerous other embodiments may be devised by those skilled in the art without departing from the spirit and scope of the invention.

What is claimed is:

1. Apparatus for ascertaining when the transmission loss between a first terminus and a second terminus of a loaded communication line is equal to, above or below a prescribed maximum, said apparatus comprising an oscillator circuit for generating an alternating current signal that is of a constant level and that is continuously varied in frequency within a predetermined range, a pre-emphasis circuit connected to said oscillator for attenuating said signal level at each of the signal frequencies to a level directly related to the prescribed maximum loss between said line termini at the corresponding signal frequency, means connected to said second terminus for transmitting coded electrical signals over said line to said first terminus, means connected to said first terminus responsive to the reception of said coded signals for connecting said attenuated signal to said first terminus for transmission to said second terminus, means connected to said second terminus responsive to the reception of said signal for directly indicating when the loss between said line termini is equal to, above or below the prescribed maximum loss at each of said signal frequencies, and means included in said indicating means for manifesting the exact magnitude by which said signal is above or below said prescribed maximum transmission loss.

2. Equipment for ascertaining when the transmission loss between a first terminus and a second terminus of a communication line is equal to, greater or less than a prescribed maximum, said equipment comprising an oscillator circuit for generating an alternating current signal that is of a constant level and that is continuously varied in frequency within a predetermined range, a pre-emphasis circuit connected to said oscillator for attenuating said signal level at each of said signal frequencies to a level directly related to the prescribed maximum loss between said line termini at the corresponding signal frequency, means connected to said second terminus for transmitting coded electrical signals over said line to said first terminus, means connected to said first terminus responsive to the reception of said coded signals for connecting said attenuated signal to said first terminus for transmission to said second terminus, means responsive to the reception of said coded signals at said first terminus for causing a unidirectional current to flow over said line between said first and said second terminus, means connectable to said second terminus for measuring the magnitude of said current, amplifying means having a variable gain, means included in said amplifying means controlled by said measuring means for varying the gain of said amplifying means by an amount related to the magnitude of said unidirectional line current, additional means included in said amplifying means for further varying the gain of said amplifying means by an amount related to the length of said line, said amplifying means responsive to the reception of said signal at said second terminus for amplifying the level of said received signal, means operatively coupled to said amplifying means for rectifying said amplified signal, a meter responsive to the rectified signal for directly indicating when the line loss is equal to, greater or less than said prescribed maximum at each of the signal frequencies, and means included in said meter for manifesting the exact magnitude by which said signal is greater or less than said prescribed maximum line loss at each of said signal frequencies.

3. In combination, a communication line having a first and a second terminus, means applying to said first terminus an electrical signal which varies in frequency within a predetermined range and has a different amplitude at each frequency, variable gain translating means responsive to the reception of said signal at said second terminus for translating the received signal amplitudes directly into indications of whether the line transmission gain at each signal frequency within said range is equal to or other than a prescribed value, and means for varying the gain of said translating means in accordance with the resistance of said line to translate said received signal amplitudes.

4. The combination set forth in claim 3 wherein said communication line comprises a loaded line.

5. The combination set forth in claim 3 wherein said communication line comprises a two-conductor non-loaded line and further comprising means for further varying the gain of said translating means in accordance with the length of said two-conductor line.

6. In a system for measuring the transmission quality of a communication line having a first and a second terminus and transmission distortion over a range of frequencies, means generating a test signal of relatively constant amplitude and whose frequency is continuously varied over said range of frequencies, means altering the amplitude of the generated signal at each of said signal frequencies, means applying said altered signal to said first terminus, means responsive to the receipt of said signal at said second terminus for translating the received signal amplitudes directly into indications of the line transmission quality at each of said frequencies within said range, means applying a unidirectional current to said line, means for measuring the magnitude of said current, and means controlled by said measuring means to condition said translating means for translating received signal amplitudes.

7. In a system in accordance with claim 6 the combination wherein said translating means comprises means for amplifying the received signal, and a meter circuit responsive to the amplified signal for directly indicating the line transmission quality at each of said frequencies within said range.

8. In a system in accordance with claim 7 the combination wherein said conditioning means comprises means controlled by said measuring means for setting the gain of said amplifying means to the value required for accurate translation of said received signals directly into indications of the line transmission quality at each frequency within said range.

9. In a system in accordance with claim 8 the combination wherein said communication line comprises a two-conductor line and said translating means further comprises means for additionally setting the gain of said amplifying means in accordance with the length of said two-conductor line.

10. Apparatus for ascertaining the transmission quality of a communication line having a first and a second terminus comprising an oscillator generating an electrical signal of relatively constant amplitude the frequency of which is varied within a predetermined range, a pre-emphasis circuit altering the amplitude of the generated signal to a different amplitude at each frequency, for applying electrical pulses to said first terminus, means responsive to the receipt of said pulses at said second terminus for applying the altered signal to said second terminus, a meter, and means responsive to the receipt of said altered signal at said first terminus for translating the received signal amplitudes directly into indications on said meter of whether the transmission loss between the line termini is equal to or other than a prescribed maximum loss at each signal frequency within said range, said translating means comprising calibrating means including means responsive to the receipt of said pulses at said second terminus for applying a direct current to said line, switch means for selectively connecting said meter in circuit with said first terminus for measuring the magnitude of said current, an adjustable resistance in said circuit for controlling the magnitude of the current flow through said meter, and means controlled by the adjustment of said resistance for conditioning said translating means to translate said received signal amplitudes.

11. Apparatus in accordance with claim 10 wherein said translating means comprises a variable gain amplifier, and a zener diode circuit responsive to the current in said line for deriving the power to operate said amplifier.

12. Apparatus in accordance with claim 11 wherein said conditioning means comprises a variable resistance adapted to be varied with the adjustment of said adjustable resistance; and said amplifier comprises a transistor having an emitter, base and collector electrodes, a resistance network including said variable resistance connected to said emitter electrode and a conductor of said line for setting the gain of said amplifier, means for coupling said received signal from said line to said base electrode including a capacitance having a reactance for blocking from said base electrode spurious signals present on said line at frequencies below the test signal range, and an output circuit connected to said collector electrode.

13. Apparatus in accordance with claim 12 wherein said output circuit comprises a transformer having a primary winding connected to said collector electrode and said diode circuit and a secondary winding for coupling the amplifier test signal from said primary winding, means connected to said secondary winding for rectifying the signal coupled from said primary winding, and means for applying the rectified signal to said meter.

14. Apparatus in accordance with claim 13 wherein said communication line comprises a two-conductor line, and said amplifier further comprises a resistance network including a variable resistor connectable in circuit with said primary winding for additionally setting the gain of said amplifier in accordance with the length of said two-conductor line.

15. Apparatus in accordance with claim 13 further comprising means for monitoring the amplified test signal comprising a sound producing device and a capacitance connected to said collector electrode for coupling said amplified test signal to said device.

References Cited in the file of this patent
UNITED STATES PATENTS

| | | |
|---|---|---|
| 1,968,164 | Nyquist | July 31, 1934 |
| 2,324,215 | Kinsburg | July 13, 1943 |
| 2,666,099 | Bonner | Jan. 12, 1954 |
| 2,735,904 | Slonczewski | Feb. 21, 1956 |
| 2,753,526 | Ketchledge | July 3, 1956 |
| 2,812,492 | Pfleger | Nov. 5, 1957 |
| 2,857,484 | Culbertson | Oct. 21, 1958 |
| 2,953,743 | De Soer | Sept. 20, 1960 |